United States Patent
Fukushige et al.

(10) Patent No.: US 9,482,923 B2
(45) Date of Patent: Nov. 1, 2016

(54) COLORED COMPOSITION AND IMAGE DISPLAY STRUCTURE

(71) Applicant: FUJIFILM CORPORATION, Minato-ku, Tokyo (JP)

(72) Inventors: Yuuichi Fukushige, Shizuoka-ken (JP); Yoshihiro Jimbo, Shizuoka-ken (JP); Takashi Kato, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 14/218,989

(22) Filed: Mar. 19, 2014

(65) Prior Publication Data

US 2014/0198374 A1 Jul. 17, 2014

Related U.S. Application Data

(63) Continuation of application No. PCT/JP2012/075105, filed on Sep. 28, 2012.

(30) Foreign Application Priority Data

Sep. 30, 2011 (JP) ................ 2011-217312
Dec. 15, 2011 (JP) ................ 2011-274606

(51) Int. Cl.
| | | |
|---|---|---|
| *C09D 11/037* | (2014.01) | |
| *C09D 11/50* | (2014.01) | |
| *C09D 11/52* | (2014.01) | |
| *C09B 23/04* | (2006.01) | |
| *C09B 23/06* | (2006.01) | |
| *C09B 23/10* | (2006.01) | |
| *G02B 26/00* | (2006.01) | |
| *G02F 1/167* | (2006.01) | |
| *C09B 23/01* | (2006.01) | |
| *C09B 23/08* | (2006.01) | |
| *G02B 1/04* | (2006.01) | |
| *G02B 5/22* | (2006.01) | |

(52) U.S. Cl.
CPC .......... *G02F 1/167* (2013.01); *C09B 23/0091* (2013.01); *C09B 23/04* (2013.01); *C09B 23/06* (2013.01); *C09B 23/08* (2013.01); *G02B 1/04* (2013.01); *G02B 26/005* (2013.01); *G02B 5/223* (2013.01)

(58) Field of Classification Search
CPC ..... C09D 11/037; C09D 11/50; C09D 11/52; C09B 23/0091; C09B 23/04; C09B 23/06; C09B 23/102; C09B 23/105; G02B 26/005; G02B 5/223; G02F 1/167
USPC ............ 106/31.49, 31.47; 252/586; 359/290, 359/296
See application file for complete search history.

(56) References Cited

U.S. PATENT DOCUMENTS

| | | | | |
|---|---|---|---|---|
| 4,866,029 | A * | 9/1989 | Evans ................ | B41M 5/3854 428/480 |
| 5,296,344 | A * | 3/1994 | Jimbo ................ | C09B 23/04 430/510 |
| 5,391,470 | A | 2/1995 | Yasuda et al. | |
| 5,422,334 | A * | 6/1995 | Janssens ........... | C09B 23/0091 428/336 |
| 5,776,667 | A * | 7/1998 | Ohlschlager ...... | C07D 261/12 430/507 |
| 8,854,714 | B2 * | 10/2014 | Clapp ................ | G02B 26/004 252/586 |
| 9,075,281 | B2 * | 7/2015 | Kato .................. | C09B 23/04 |
| 2010/0292450 | A1 | 11/2010 | Shiga et al. | |
| 2013/0241815 | A1 | 9/2013 | Ishida et al. | |
| 2013/0301110 | A1 * | 11/2013 | Kato .................. | G02B 26/005 359/290 |
| 2013/0321895 | A1 * | 12/2013 | Naito ................. | G02B 26/005 106/31.49 |
| 2015/0253591 | A1 * | 9/2015 | Kato .................. | G02B 26/005 359/290 |

FOREIGN PATENT DOCUMENTS

| | | |
|---|---|---|
| EP | 412379 A1 | 2/1991 |
| JP | 03-72340 A | 3/1991 |
| JP | 6-75334 A | 3/1994 |
| JP | 7-199407 A | 8/1995 |
| JP | 2008-246908 A1 | 10/2008 |

| JP | 2009-138189 A | 6/2009 |
| JP | 2009-263517 A | 11/2009 |
| JP | 2010-064363 A | 3/2010 |
| JP | 2010-262058 A | 11/2010 |
| WO | 2009/063880 A | 5/2009 |
| WO | 2010/104606 | 9/2010 |
| WO | WO 2011/017446 A1 * | 2/2011 |
| WO | 2011/111710 A | 9/2011 |

OTHER PUBLICATIONS

English translation of JP 2009/263517, Nov. 2009; 24 pages.*
English language translation of the following: Office action dated Dec. 2, 2015, from the JPO in a Japanese patent application corresponding to the instant patent application. This office action translation is submitted now in order to supplement the understanding of the cited references which are being disclosed in the instant information Disclosure Statement.
International Search Report issued in International Application No. PCT/JP2012/075105 on Dec. 25, 2012.
Written Opinion of the ISA issued in International Application No. PCT/JP2012/075105 on Dec. 25, 2012.
Nature(London), 425, 383 (2003).
English language translation of the following: Office action dated Jul. 28, 2015, from the JPO in a Japanese patent application corresponding to the instant patent application. This office action translation is submitted now in order to supplement the understanding of the cited references which are being disclosed in the instant Information Disclosure Statement.

* cited by examiner

*Primary Examiner* — Helene Klemanski
(74) *Attorney, Agent, or Firm* — SOLARIS Intellectual Property Group, PLLC

(57) ABSTRACT

A colored composition including a non-polar solvent and a methine dye represented by the following Formula (1) and having a solubility in n-hexane of 1% by mass or higher at 25° C. and 0.1 MPa:

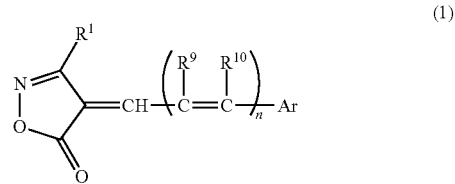

(1)

wherein, in Formula (1), $R^1$ represents a hydrogen atom, an alkyl group, an aryl group, $-COOR^{11}$, or $-CONR^{11}R^{12}$; Ar represents an aromatic ring; each of $R^9$ and $R^{10}$ independently represents a hydrogen atom or an alkyl group; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; n represents an integer from 0 to 2; and none of $R^1$, $R^9$, $R^{10}$ and Ar has a dissociable group different from NH.

15 Claims, 1 Drawing Sheet

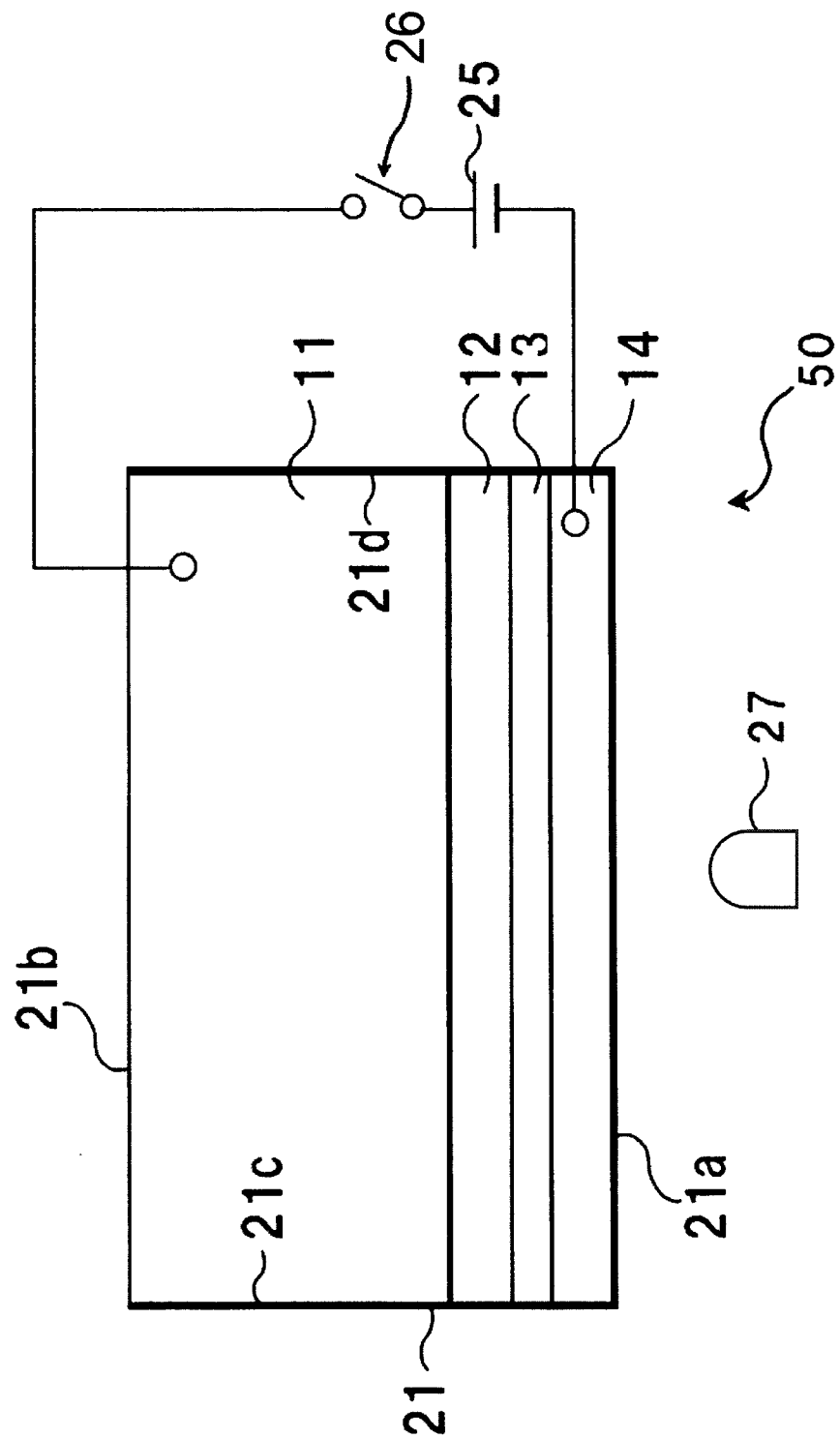

COLORED COMPOSITION AND IMAGE DISPLAY STRUCTURE

CROSS-REFERENCE TO RELATED APPLICATION

This application is a continuation application of International Application No. PCT/JP2012/075105, filed Sep. 28, 2012, the disclosure of which is incorporated herein by reference in its entirety. Further, this application claims priority from Japanese Patent Application No. 2011-217312, filed Sep. 30, 2011, and Japanese Patent Application No. 2011-274606, filed Dec. 15, 2011, the disclosures of which are incorporated herein by reference in their entirety.

BACKGROUND OF THE INVENTION

1. Field of the Invention

The present invention relates to a colored composition and an image display structure.

2. Description of the Related Art

In recent years, many organic dyes have been used in display materials, optical recording media, inkjet recording materials, etc. In a case in which a dye is used in a coating process or an inkjet recording process, the dye is required to have a high molar absorption coefficient as well as high solubility in solvents in order to increase coloring efficiency.

Since a display utilizing an electrowetting method (EWD) has been reported in Nature (London), 425, 383 (2003), electrowetting displays have attracted attention. Electrowetting displays employ an image forming method in which plural pixels filled with two phases formed by a hydrophilic medium and an oil-based color ink are arranged on a substrate, affinity for the hydrophilic medium interface or the oil-based color ink interface is controlled by on-off control of voltage application for each pixel, and image is displayed by spreading/shrinking the oil-based color ink over the substrate. Dyes for use in such electrowetting displays are required to have high solubility in hydrocarbon solvents.

Examples of known dyes for use in color filters (display materials) include various methine complex compounds such as the following compounds (for example, see Japanese Patent Application Laid-Open (JP-A) No. 20089-292970)

Examples of known dyes for color filters (display materials) include various methine dye compounds such as the following compounds D-101 and D-102.

In addition, water-insoluble isoxazolone methine dyes used in silver halide photographic light-sensitive materials are known (for example, see European Patent Application Publication No. 412379). Furthermore, isoxazolone methine dyes and isoxazoline methine dyes having high solubility in polar solvents used as dyes for thermal transfer printing are known (for example, see Japanese Patent Application Laid-Open (JP-A) No. 2009-263517 and JP-A No. 2008-246908).

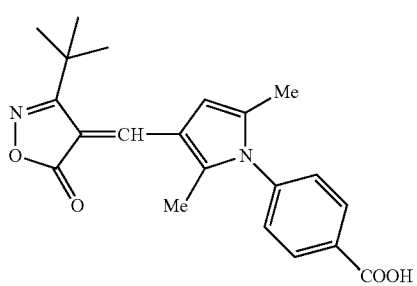
D-101

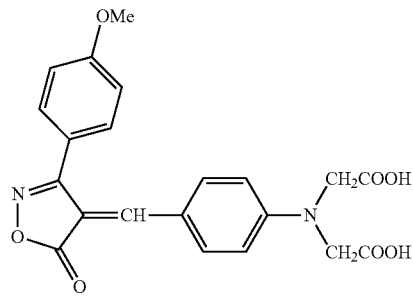
D-102

SUMMARY OF THE INVENTION

However, compounds D-101 and D-102 and the conventional dyes specifically described in the above documents have insufficient solubility in non-polar solvents, particularly in hydrocarbon solvents. Accordingly, further improvement has been required.

The present invention aims to provide a colored composition that contains a methine dye having favorable solubility in non-polar solvents, particularly in hydrocarbon solvents, and is suitable for use in image display materials, particularly image display materials for display devices operating on the principle of electrophoresis or electrowetting, and to provide an image display structure that has a favorable on-off property (optical-shutter property) at the time of image display.

<1> A colored composition for producing an optical-shutter layer of a display device that operates on the principle of electrowetting, the colored composition including:

a non-polar solvent; and a methine dye represented by the following Formula (1) and having a solubility in n-hexane of 1% by mass or higher at 25° C. and 0.1 MPa.

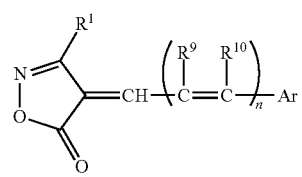
(1)

Wherein, in Formula (1), $R^1$ represents a hydrogen atom, an alkyl group, an aryl group, $-COOR^{11}$, or $-CONR^{11}R^{12}$; Ar represents an aromatic ring; each of $R^9$ and $R^{10}$ independently represents a hydrogen atom or an alkyl group; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; n represents an integer from 0 to 2; and none of $R^1$, $R^9$, $R^{10}$ and Ar has a dissociable group different from NH.

The colored composition according to <1>, wherein the methine dye is a compound represented by the following Formula (2) or Formula (3).

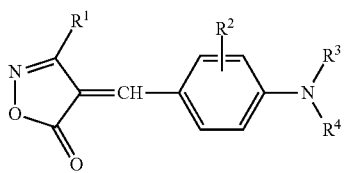

(2)

Wherein, in Formula (2), $R^1$ represents a hydrogen atom, an alkyl group, an aryl group, —COOR$^{11}$, or —CONR$^{11}$R$^{12}$; $R^2$ represents a hydrogen atom, a halogen atom, an alkyl group, an alkoxy group, an aryloxy group, —NHCOR$^{11}$, —NHCONHR$^{11}$, or —NHCOOR$^{11}$; each of $R^3$ and $R^4$ independently represents a hydrogen atom, an alkyl group, or an aryl group, and $R^3$ and $R^4$ may be linked to each other to form a 5-membered, 6-membered, or 7-membered ring; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; and none of $R^1$ to $R^4$ has a dissociable group different from NH.

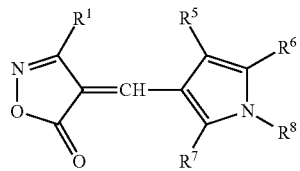

(3)

Wherein, in Formula (3), $R^1$ represents a hydrogen atom, an alkyl group, an aryl group, —COOR$^{11}$, or —CONR$^{11}$R$^{12}$; each of $R^5$, $R^6$, and $R^7$ independently represents a hydrogen atom, an alkyl group, or an aryl group; $R^8$ represents a hydrogen atom, an alkyl group, or an aryl group; $R^5$ and $R^6$ may be linked to each other to form a 5-membered or 6-membered ring; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; and none of $R^1$ and $R^5$ to $R^8$ has a dissociable group different from NH.

<3> The colored composition according to <2>, wherein at least one selected from the group consisting of $R^1$, $R^3$ and $R^4$ in Formula (2) represents an alkyl group having from 7 to 30 carbon atoms.

<4> The colored composition according to <1>, wherein n in Formula (1) represents 1 or 2.

<5> The colored composition according to any one of <1> to <4>, wherein a relative dielectric constant of the methine dye is from 2 to 10.

<6> The colored composition according to any one of <1> to <5>, wherein a viscosity of the colored composition at 20° C. is from 0.01 mPa·s to 10 mPa·s.

<7> The colored composition according to any one of <1> to <6>, wherein a content of the methine dye is from 5% by mass to 70% by mass with respect to a total mass of the colored composition.

<8> The colored composition according to any one of <1> to <7>, wherein the non-polar solvent includes a solvent selected from the group consisting of n-hexane, n-decane, dodecane, tetradecane and hexadecane.

<9> The colored composition according to any one of <1> to <8>, wherein a content of the non-polar solvent is 70% by mass or higher with respect to a total mass of solvents included in the colored composition.

<10> A colored composition for producing a color filter of a display device that operates on the principle of electrophoresis, the colored composition including:
a non-polar solvent; and
a methine dye represented by the following Formula (1) and having a solubility in n-hexane of 1% by mass or higher at 25° C. and 0.1 MPa:

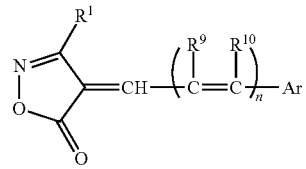

(1)

wherein, in Formula (1), $R^1$ represents a hydrogen atom, an alkyl group, an aryl group, —COOR$^{11}$, or —CONR$^{11}$R$^{12}$; Ar represents an aromatic ring; each of $R^9$ and $R^{10}$ independently represents a hydrogen atom or an alkyl group; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; n represents an integer from 0 to 2; and none of $R^1$, $R^9$, $R^{10}$ and Ar has a dissociable group different from NH.

<11> The colored composition according to <10>, wherein the methine dye is a compound represented by the following Formula (2) or Formula (3).

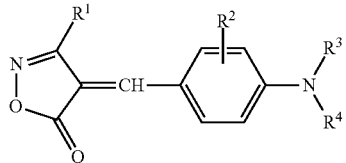

(2)

Wherein, in Formula (2), $R^1$ represents a hydrogen atom, an alkyl group, an aryl group, —COOR$^{11}$, or —CONR$^{11}$R$^{12}$; $R^2$ represents a hydrogen atom, a halogen atom, an alkyl group, an alkoxy group, an aryloxy group, —NHCOR$^{11}$, —NHCONHR$^{11}$, or —NHCOOR$^{11}$; each of $R^3$ and $R^4$ independently represents a hydrogen atom, an alkyl group, or an aryl group, and $R^3$ and $R^4$ may be linked to each other to form a 5-membered, 6-membered, or 7-membered ring; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; and none of $R^1$ to $R^4$ has a dissociable group different from NH.

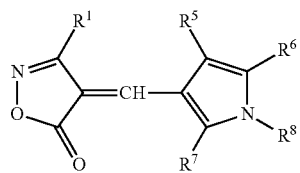

(3)

Wherein, in Formula (3), $R^1$ represents a hydrogen atom, an alkyl group, an aryl group, —COOR$^{11}$, or —CONR$^{11}$R$^{12}$; each of $R^5$, $R^6$, and $R^7$ independently represents a hydrogen atom, an alkyl group, or an aryl group; $R^8$ represents a hydrogen atom, an alkyl group, or an aryl group; $R^5$ and $R^6$ may be linked to each other to form a 5-membered or 6-membered ring; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; and none of $R^1$ and $R^5$ to $R^8$ has a dissociable group different from NH.

<12> The colored composition according to <11>, wherein at least one selected from the group consisting of $R^1$, $R^3$ and $R^4$ in Formula (2) represents an alkyl group having from 7 to 30 carbon atoms.

<13> The colored composition according to <10>, wherein n in Formula (1) represents 1 or 2.

<14> The colored composition according to any one of <10> to <13>, wherein a relative dielectric constant of the methine dye is from 2 to 10.

<15> The colored composition according to any one of <10> to <14>, wherein a viscosity of the colored composition at 20° C. is from 0.01 mPa·s to 10 mPa·s.

<16> The colored composition according to any one of <10> to <15>, wherein a content of the methine dye is from 5% by mass to 70% by mass with respect to a total mass of the colored composition.

<17> The colored composition according to any one of <10> to <16>, wherein the non-polar solvent includes a solvent selected from the group consisting of n-hexane, n-decane, dodecane, tetradecane and hexadecane.

<18> The colored composition according to any one of <10> to <17>, wherein a content of the non-polar solvent is 70% by mass or higher with respect to a total mass of solvents included in the colored composition.

<19> An image display structure including:
a hydrophobic polymer layer having a hydrophobic surface;
an oil layer arranged to contact the surface of the hydrophobic polymer layer and formed using the colored composition of any one of <1> to <9>; and
a hydrophilic liquid layer arranged to contact the oil layer.

<20> An image display structure including:
a hydrophobic polymer layer having a hydrophobic surface;
an oil layer arranged to contact the surface of the hydrophobic polymer layer and formed using the colored composition of any one of <10> to <18>; and
a hydrophilic liquid layer arranged to contact the oil layer.

In the invention, the methine dye represented by Formula (1) does not have any dissociable group (different from NH), such as —SO$_3$H, —PO$_3$H$_2$, —CO$_2$H, or —OH, in the molecule thereof, and easily dissolves in non-polar solvents. Therefore, a colored composition can be prepared by dissolving the methine dye in a non-polar solvent.

The methine dye represented by Formula (1) has, preferably, a long-chain alkyl group or a branched alkyl group, and more preferably, a linear or branched alkyl group having a relatively-large number of carbon atoms, for example, from 7 to 30 carbon atoms. In particular, the methine dye represented by Formula (1) having a long-chain alkyl group or a branched alkyl group has excellent solubility in non-polar solvents. It is presumed that the SP value (solubility parameter) of the methine dye represented by Formula (1) approaches the SP value of the non-polar solvent to be employed in the invention, and the miscibility of the methine dye with a non-polar solvent is improved as a result thereof. It is also presumed that the SP value of each of D-101 and D-102 differs substantially from the SP value of the solvent due to each of D-101 and D-102 having polar groups, and the solubility of each of D-101 and D-102 decreases as a result thereof.

BRIEF DESCRIPTION OF THE DRAWING

FIG. 1 is a schematic cross-sectional view showing a configuration example of a display device operating on the principle of electrowetting.

DETAILED DESCRIPTION OF THE INVENTION

Methine Dye

In the invention, a methine dye represented by the following Formula (1) has a solubility in n-hexane of 1% by mass or higher at 25° C. and 0.1 MPa.

The methine dye represented by Formula (1) and having a solubility in n-hexane of 1% by mass or higher at 25° C. and 0.1 MPa is useful as a dye for displays etc., particularly, for display devices that operate on the principle of electrowetting or displays that operate on the principle of electrophoresis.

Hereinbelow, the methine dye represented by Formula (1) is described in detail.

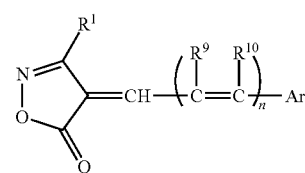

(1)

In Formula (1), $R^1$ represents a hydrogen atom, an alkyl group, an aryl group, —COOR$^{11}$, or —CONR$^{11}$R$^{12}$; Ar represents an aromatic ring; each of $R^9$ and $R^{10}$ independently represents a hydrogen atom or an alkyl group; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; n represents an integer from 0 to 2; and none of $R^1$, $R^9$, $R^{10}$ and Ar has a dissociable group different from NH.

In Formula (1), the alkyl group represented by $R^1$ may have a substituent, and is preferably an alkyl group having from 1 to 30 carbon atoms. Specific examples of the alkyl group include a methyl group, an ethyl group, an n-butyl group, a tert-butyl group, a 1-methylcyclopropyl group, an n-hexyl group, a 3-heptyl group, an n-nonyl group, an n-undecyl group, a 2-ethylhexyl group, a 2-methylhexyl group, a chloromethyl group, a trifluoromethyl group, an ethoxycarbonylmethyl group, and a perfluoroalkyl group. Among these, a methyl group, an ethyl group, and a tert-butyl group are preferable.

The aryl group represented by $R^1$ may have a substituent, and is preferably an aryl group having from 6 to 30 carbon atoms. Specific examples of the aryl group include a phenyl group, a 4-methoxyphenyl group, a 4-dibutylaminophenyl group, a 4-[(2-ethylhexanoyl)amino]phenyl group, 4-butylphenyl group, and a 4-hexylphenyl group.

In Formula (1), the alkyl group represented by $R^{11}$ or $R^{12}$ may have a substituent, and is preferably an alkyl group having from 1 to 15 carbon atoms. Specific examples of the alkyl group include a methyl group, an ethyl group, an ethoxycarbonylmethyl group, a butoxycarbonylmethyl group, an n-octyl group, a 2-ethylhexyl group, a dodecyl group, a cyclohexyl group, a cyanoethyl group, a 2,2,3,3-tetrafluoropropyl group, a 2,2,3,3,4,4,5,5,6,6-decafluorohexyl group, a chloroethyl group, an acetoxyethyl group, and a dimethylaminomethyl group.

The aryl group represented by $R^{11}$ or $R^{12}$ may have a substituent, and is preferably an aryl group having from 6 to 12 carbon atoms. Specific examples of the aryl group include a phenyl group, a 4-methylphenyl group, a 4-ethylphenyl group, a 4-methoxyphenyl group, a 4-(2-ethylhexyloxy)phenyl group, and a 4-dodecyloxyphenyl group.

Examples of the 5-membered, 6-membered, or 7-membered ring formed by mutual linking of $R^{11}$ and $R^{12}$ include a 5-membered, 6-membered, or 7-membered ring containing a nitrogen atom, and preferable examples thereof include a pyrrolidine ring, a piperidine ring, a morpholine ring, a piperazine ring, and a hexamethyleneimine ring. The 5-membered, 6-membered, or 7-membered ring may have a substituent.

The alkyl group represented by $R^9$ or $R^{10}$ may have a substituent, and is preferably an alkyl group having from 1 to 10 carbon atoms. Specific examples of the alkyl group include a methyl group, an ethyl group, and a propyl group.

Each of $R^9$ and $R^{10}$ preferably represents a hydrogen atom.

The aromatic ring represented by Ar is preferably a 5-membered or 6-membered aromatic ring, and specific examples thereof include aromatic rings such as a benzene ring, a naphthalene ring, a pyrrole ring, an indole ring, a pyridine ring, a quinoline ring, a pyrazine ring, and a quinoxaline ring. Among these, a benzene ring, a pyrrole ring, and an indole ring are preferable. The aromatic ring represented by Ar may be substituted by an alkyl group having from 1 to 30 carbon atoms.

None of $R^1$, $R^9$, $R^{10}$ and Ar has a dissociable group different from NH.

Preferable examples of the methine dye represented by Formula (1) include a methine dye represented by the following Formula (2). Hereinbelow, the methine dye represented by Formula (2) is described in detail.

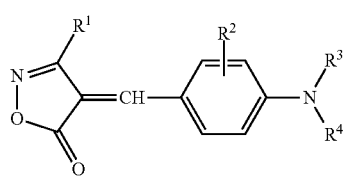

(2)

In Formula (2), $R^1$ has the same definition as $R^1$ in Formula (1) above. $R^2$ represents a hydrogen atom, a halogen atom, an alkyl group, an alkoxy group, an aryloxy group, —NHCOR$^{11}$, —NHCONHR$^{11}$, or —NHCOOR$^{11}$; each of $R^3$ and $R^4$ independently represents a hydrogen atom, an alkyl group, or an aryl group. $R^3$ and $R^4$ may be linked to each other to form a 5-membered, 6-membered, or 7-membered ring. $R^{11}$ and $R^{12}$ in $R^1$ and $R^2$ have the same definitions as $R^{11}$ and $R^{12}$ in Formula (1), respectively. None of $R^1$ to $R^4$ has a dissociable group different from NH.

In Formula (2), the halogen atom represented by $R^2$ is preferably a fluorine atom or a chlorine atom.

The alkyl group represented by $R^2$ is preferably an alkyl group having from 1 to 20 carbon atoms. Specific examples thereof include a methyl group, an ethyl group, an n-butyl group, a tert-butyl group, and a trifluoromethyl group. Among these, a methyl group is preferable.

The alkoxy group represented by $R^2$ may have a substituent, and is preferably an alkoxy group having from 1 to 20 carbon atoms. Specific examples thereof include a methoxy group and an ethoxy group.

The aryloxy group represented by $R^2$ may have a substituent, and is preferably an aryloxy group having from 6 to 16 carbon atoms. Specific examples the aryloxy group include a phenoxy group.

In Formula (2), the alkyl group represented by $R^3$ or $R^4$ is preferably an alkyl group having from 1 to 30 carbon atoms. Specific examples thereof include a methyl group, an ethyl group, an n-butyl group, an n-octyl group, an n-decyl group, a 2-ethylhexyl group, a 2-methylhexyl group, a 3,5,5-trimethylhexyl group, an n-dodecyl group, an ethoxycarbonylmethyl group, an ethoxycarbonylethyl group, and a N,N-dibutylaminocarbonylmethyl group.

The aryl group represented by $R^3$ or $R^4$ may have a substituent, and is preferably an aryl group having from 6 to 30 carbon atoms. Specific examples the aryl group include a phenyl group, a 4-methoxyphenyl group, a 4-(2-ethylhexyloxy)phenyl group, and a 4-dodecyloxyphenyl group.

Examples of the 5-membered, 6-membered, or 7-membered ring formed by mutual linking of $R^3$ and $R^4$ include a 5-membered, 6-membered, or 7-membered ring containing a nitrogen atom. Among these, a pyrrolidine ring, a piperidine ring, a morpholine ring, a piperazine ring, and a hexamethyleneimine ring are preferable. The 5-membered, 6-membered, or 7-membered ring may have a substituent.

In particularly, it is preferable that at least one selected from the group consisting of $R^1$, $R^3$, and $R^4$ represents an alkyl group having from 7 to 30 carbon atoms. It is more preferable that each of $R^3$ and $R^4$ independently represents an alkyl group having from 7 to 30 carbon atoms.

In the compound represented by Formula (2), it is preferable that at least one selected from the group consisting of $R^1$ to $R^4$ represents any of the preferable groups mentioned above, more preferable that at least two selected from the group consisting of $R^1$ to $R^4$ each independently represents any of the preferable groups mentioned above, and still more preferable that all of $R^1$ to $R^4$ each independently represents any of the preferable groups mentioned above.

Preferable examples of the methine dye represented by Formula (1) further include a methine dye represented by the following Formula (3). Hereinbelow, the methine dye represented by Formula (3) is described in detail.

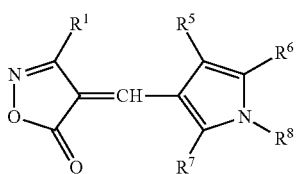

(3)

In Formula (3), $R^1$ has the same definition as $R^1$ in Formula (1) above. Each of $R^5$, $R^6$, and $R^7$ independently represents a hydrogen atom, an alkyl group, or an aryl group; and $R^8$ represents a hydrogen atom, an alkyl group, or an aryl group. $R^5$ and $R^6$ may be linked to each other to form a 5-membered or 6-membered ring. $R^{11}$ and $R^{12}$ in $R^1$ have the same definitions as $R^{11}$ and $R^{12}$ in Formula (1), respectively. None of $R^1$ and $R^5$ to $R^8$ has a dissociable group different from NH.

In Formula (3), the alkyl group represented by $R^5$, $R^6$, or $R^7$ is preferably an alkyl group having from 1 to 8 carbon atoms, and specific examples thereof include a methyl group and an ethyl group.

The aryl group represented by $R^5$, $R^6$, or $R^7$ is preferably an aryl group having from 6 to 10 carbon atoms, and specific examples thereof include a phenyl group.

In Formula (3), the alkyl group represented by $R^8$ may have a substituent, and is preferably an alkyl group having from 1 to 18 carbon atoms. Specific examples of the alkyl group include a methyl group, an ethyl group, an ethoxycarbonylmethyl group, a 2-cyanoethyl group, a 2-propionylaminoethyl group, a 2-ethylhexyl group, an n-octyl group, an n-decyl group, an n-dodecyl group, a 3,5,5-trimethylhexyl group, a dimethylaminomethyl group, a di[(methoxycarbonylmethyl)amino]propyl group, a benzyl group, and a phenacyl group.

The aryl group represented by $R^8$ may have a substituent, and is preferably an aryl group having from 6 to 22 carbon atoms. Specific examples thereof include a phenyl group, a 2-methoxy-5-ethoxycarbonylphenyl group, a 4-[di(ethoxycarbonylmethyl)amino]carbonylphenyl group, a 4-octyloxyphenyl group, a 4-dodecyloxyphenyl group, and a pyridyl group.

The amino group represented by $R^8$ is preferably a dialkylamino group, and specific examples thereof include a dimethyl amino group, a diethylamino group, and a pyrrolidino group.

The 5-membered ring formed by mutual linking of $R^5$ and $R^6$ is preferably a pyrrole ring. The 6-membered ring formed by mutual linking of $R^5$ and $R^6$ is preferably a benzene ring or a pyridine ring, and more preferably a benzene ring. Each of the 5-membered ring and the 6-membered ring may have a substituent.

In the compound represented by Formula (3), it is preferable that at least one selected from the group consisting of $R^1$ and $R^5$ to $R^8$ represents any of the preferable groups mentioned above, more preferable that at least two selected from the group consisting of $R^1$ and $R^5$ to $R^8$ each independently represents any of the preferable groups mentioned above, and still more preferable that all of $R^1$ and $R^5$ to $R^8$ each independently represents any of the preferable groups mentioned above.

In the methine dye represented by Formula (1), n preferably represents 1 or 2, and more preferably represents 1.

Specific examples of the compounds represented by Formulae (1) to (3) are shown below. However, the invention is not limited thereto.

Here, in the structures shown below, "Me" represents a methyl group, "t-Bu" represents a tert-butyl group, "Ph" represents a phenyl group, "n-Bu" represents a normal butyl group, "i-Pr" represents an isopropyl group, and "Et" represents an ethyl group. In addition, "$C_8H_{17}{}^n$" represents a normal octyl group, "$C_{12}H_{25}{}^n$" represents a normal dodecyl group, "$C_4H_9{}^n$" represents a normal butyl group, and "$C_4H_9{}^t$" represents a tertiary butyl group. In the description of an alkyl group, those indicated merely by the numbers of carbon atoms and the numbers of hydrogen atoms represent "normal alkyl group".

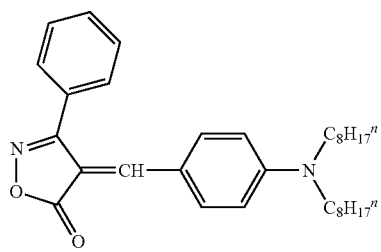

D-1

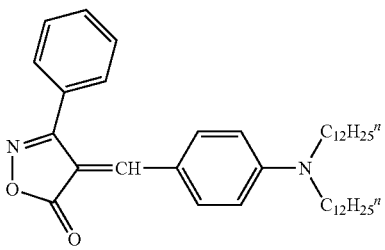

D-2

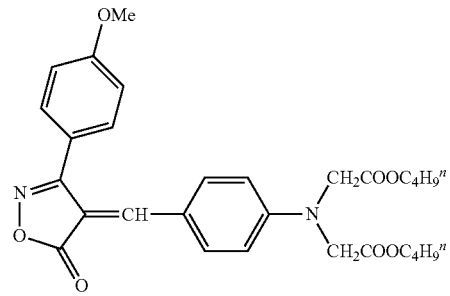

D-3

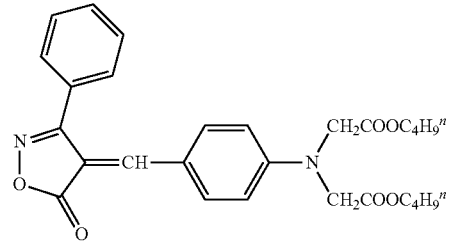

D-4

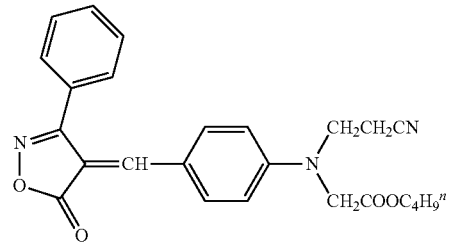

D-5

D-6
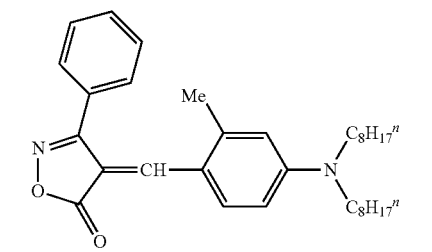
D-7
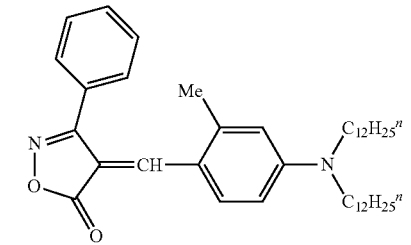
D-8
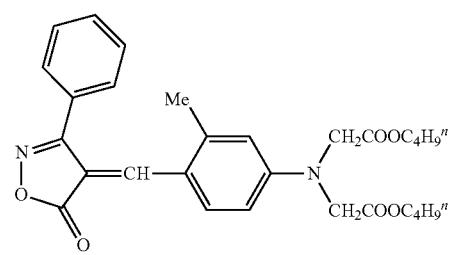
D-9
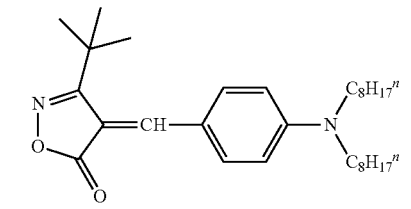
D-10
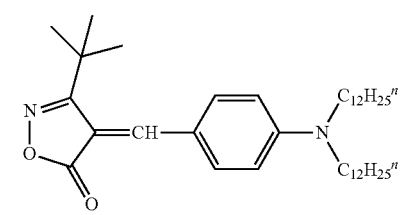
D-11
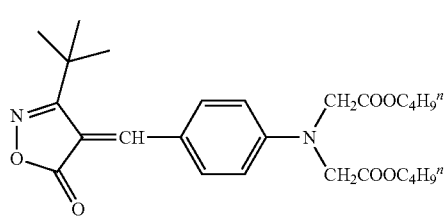
D-12
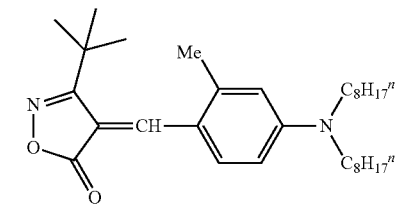
D-13
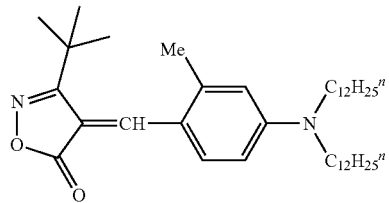
D-14
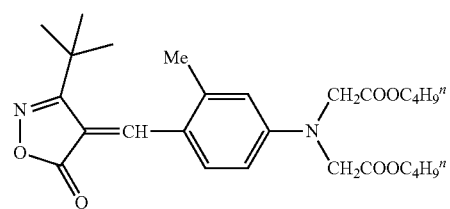
D-15
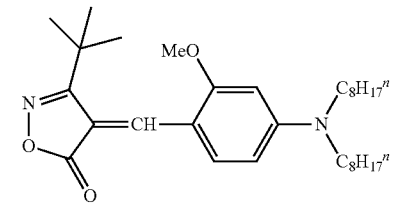
D-16
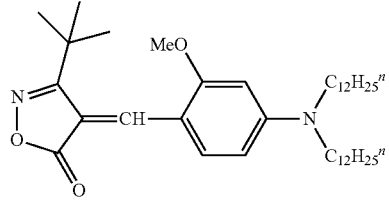
D-17
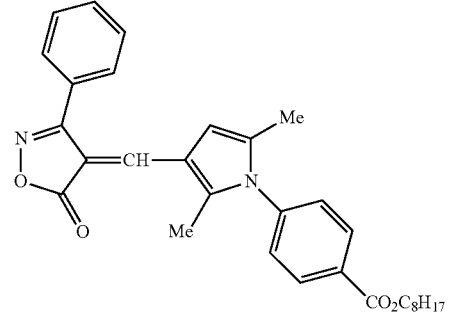
D-18
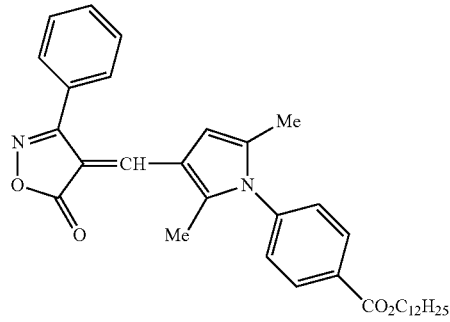

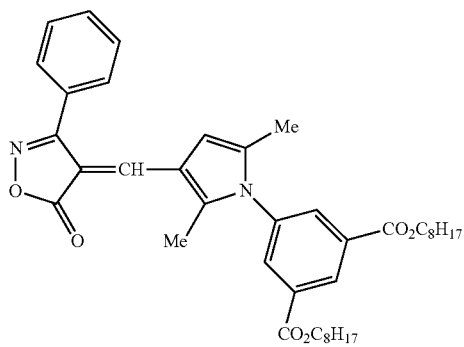 D-19
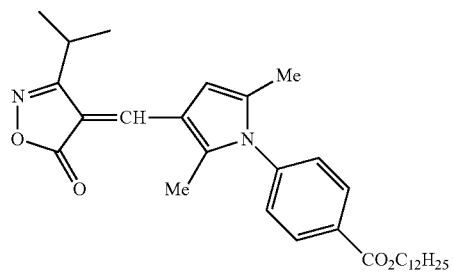 D-24
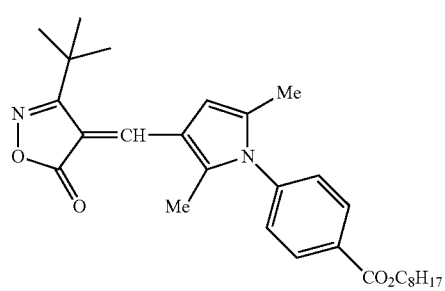 D-20
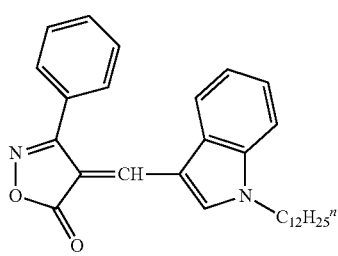 D-25
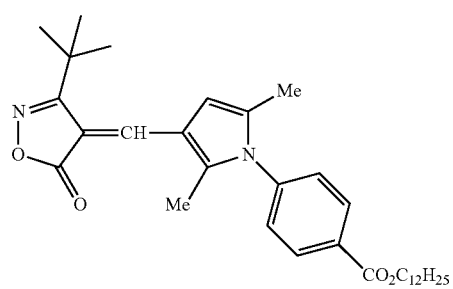 D-21
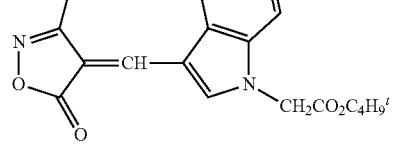 D-26
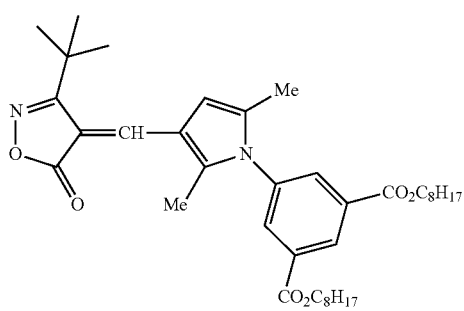 D-22
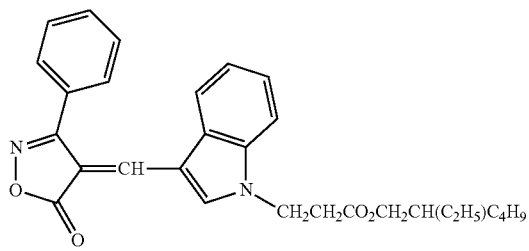 D-27
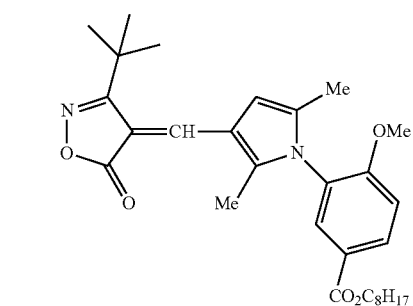 D-23
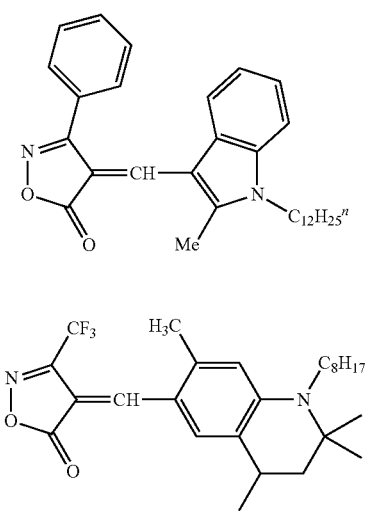 D-28
D-29

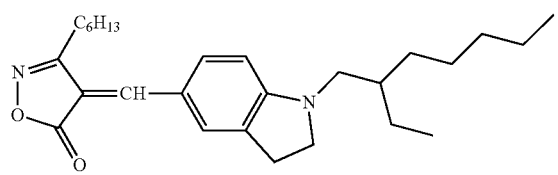
D-30
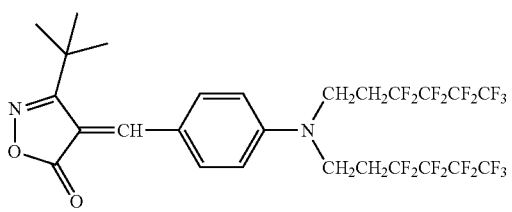
D-31
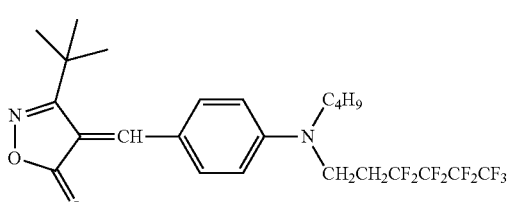
D-32
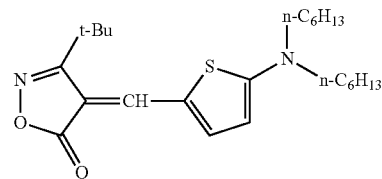
D-33
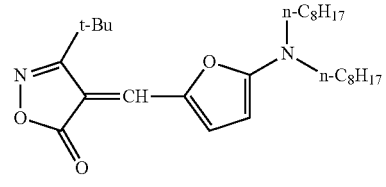
D-34
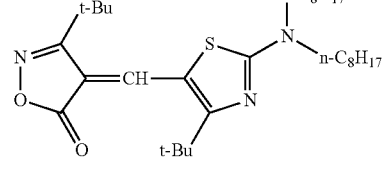
D-35
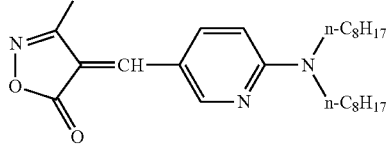
D-36
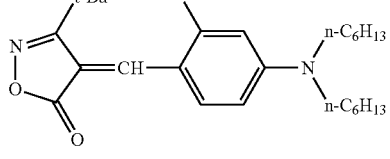
D-37
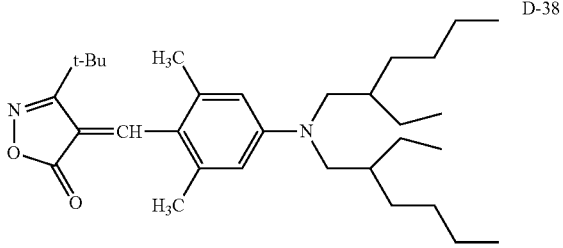
D-38
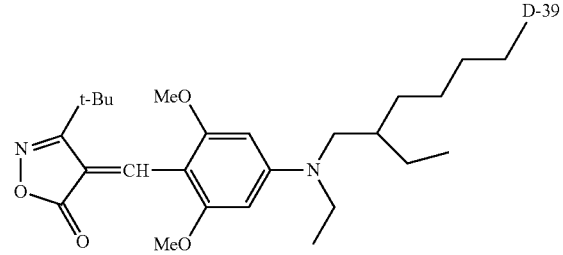
D-39
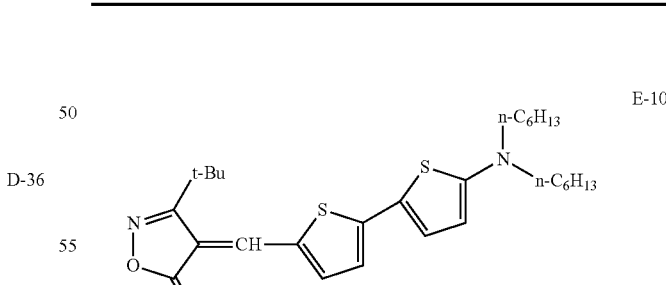
| Compound No. | $R^1$ | n | $R^2$ | $R^3$ | $R^4$ |
|---|---|---|---|---|---|
| E-1 | Me | 1 | H | n-$C_{12}H_{25}$ | n-$C_{12}H_{25}$ |
| E-2 | t-Bu | 1 | Me | n-$C_{12}H_{25}$ | n-$C_{12}H_{25}$ |
| E-3 | t-Bu | 1 | MeO | n-$C_8H_{17}$ | n-$C_8H_{17}$ |
| E-4 | Ph | 1 | H | n-$C_{10}H_{23}$ | n-$C_{10}H_{23}$ |
| E-5 | 4-n-BuPh | 1 | Et | —$CH_2CH(Et)C_4H_9$ | —$CH_2CH(Et)C_4H_9$ |
| E-6 | $CF_3$ | 1 | $CF_3O$ | n-$C_8H_{17}$ | n-$C_8H_{17}$ |
| E-7 | Me | 2 | Me | n-$C_{12}H_{25}$ | n-$C_{12}H_{25}$ |
| E-8 | t-Bu | 2 | MeO | n-$C_{12}H_{25}$ | n-$C_{12}H_{25}$ |
| E-9 | i-Pr | 2 | F | —$CH_2CH(Et)C_4H_9$ | —$CH_2CH(Et)C_4H_9$ |
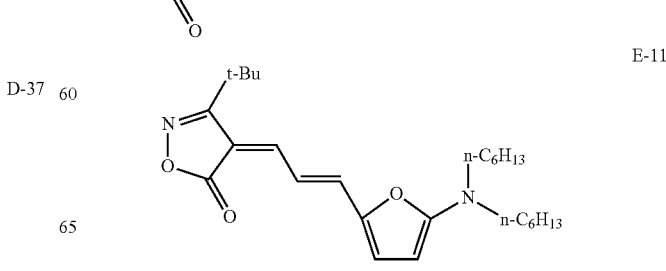
E-10
E-11

-continued

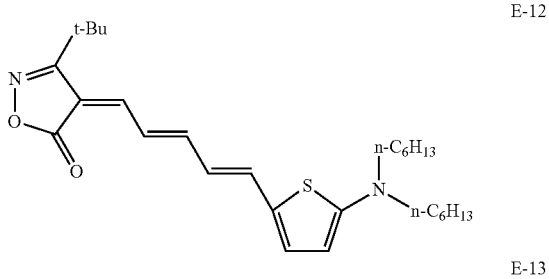

These compounds can be synthesized based on known methods such as those described in Japanese Patent No. 2707371, and JP-A Nos. H05-45789, 2009-263517, and H03-72340.

Solubility of Methine Dye

The methine dye according to the invention has good solubility in non-polar solvents, particularly in hydrocarbon solvents, and has solubility in n-hexane of 1% by mass or higher at 25° C. and 0.1 MPa. A solubility in n-hexane of 1% by mass or higher indicates that the methine dye according to the invention can be suitably used in materials (for example, optical-shutter layers or color filters) for producing displays that operate on the principle of electrowetting or electrophoresis.

Hereinbelow, the solubility of the dye in n-hexane at 25° C. and 0.1 MPa is sometimes simply referred to as "solubility".

In a case in which the methine dye according to the invention is used in an image display material for producing a display that operates on the principle of electrowetting or for producing a display that operates on the principle of electrophoresis (for example, in a display member such as an image display structure such as (i) an optical-shutter for switching the on-off states (image displaying/non-displaying states) of pixels or (ii) a color display layer (color filter) of a display device that operates on the principle of electrophoresis), the solubility of the methine dye is preferably 3% by mass or higher, and more preferably 5% by mass or higher. A higher solubility is more preferable. Nevertheless, the solubility of the methine dye is usually about 80% by mass or lower.

Colored Composition

The colored composition of the invention includes a non-polar solvent described below and at least one above-mentioned methine dye according to the invention.

In one embodiment, the colored composition of the invention includes only one methine dye according to the invention. In another embodiment, the colored composition of the invention includes two or more methine dyes according to the invention. When the colored composition of the invention includes two or more methine dyes, the ratio therebetween may freely be selected.

The content of the methine dye according to the invention in the colored composition is preferably from 5% by mass to 70% by mass, and more preferably from 10% by mass to 50% by mass, with respect to the total mass of the colored composition. When the content of the methine dye in the invention is within the above range, a desired optical-shutter layer or color filter having sufficient color can be obtained in a case in which the colored composition of the invention is used in the production of an optical-shutter layer or color filter of a display that operates on the principle of electrowetting or electrophoresis mentioned below.

The methine dye according to the invention may be the only dye contained in the colored composition of the invention. Alternatively, the colored composition of the invention may further include a dye other than the methine dye, in order to obtain a desired hue. For example, the methine dye according to the invention may be mixed with a red dye and/or a blue dye, each of which has a structure different from that of the methine dye, to form a black composition.

Other Dyes

The dye having a structure different from that of the methine dye, which may be optionally contained in the colored composition of the invention, may be freely selected from dyes having sufficient solubility or dispersibility in the non-polar solvent to be employed, as long as the effects of the methine dye are not impaired.

In a case in which the colored composition of the invention is used for electrowetting displays, the dye, other than the methine dye, that is optionally contained in the colored composition of the invention may be freely selected from dyes that dissolve in non-polar solvents such as aliphatic hydrocarbon solvents. Examples thereof include azo dyes and anthraquinone dyes, and specific examples thereof include Oil Blue N (alkylamine-substituted anthraquinone), Solvent Green, Sudan Red, and Sudan Black.

Non-Polar Solvent

The colored composition of the invention includes at least one non-polar solvent. Here, the non-polar solvent means a solvent having low relative dielectric constant (so-called apolar solvent).

The non-polar solvent contained in the colored composition of the invention dissolves the methine dye according to the invention, and specific examples of the non-polar solvent include aliphatic hydrocarbon solvents (preferably, having from 6 to 30 carbon atoms) such as n-hexane, n-decane, dodecane, tetradecane, and hexadecane.

The colored composition of the invention includes a non-polar solvent, and may further include a solvent other than non-polar solvents, to the extent that the effects of the present invention are not impaired.

In the invention, the content of non-polar solvent in the colored composition of the invention is preferably 70% by mass of higher, and more preferably 90% by mass of higher, with respect to the total solvent amount in the colored composition. When the content of non-polar solvent in the colored composition is 70% by mass of higher, the solubility of the methine dye is maintained in a more favorable manner, and an excellent optical-shutter property and excellent display contrast can be exhibited in a case in which the colored composition of the invention is used for producing a display device that operates on the principle of electrophoresis or electrowetting. More preferably, the colored composition of the invention includes a non-polar solvent as the only solvent component (that is, the proportion of the non-polar solvent to the entire solvent contained in the colored composition is 100% by mass).

Other Components

The colored composition of the invention may further include various additives, such as ultraviolet absorbers and antioxidants, as necessary.

The content of additives is not specifically limited. Usually, additives are used in an amount of about 20% by mass or lower with respect to the total mass of the colored composition.

The colored composition (ink) for a display device that operates on the principle of electrowetting can be prepared by dissolving the methine dye according to the invention and, if necessary, other optional dyes in a non-polar solvent such as an aliphatic hydrocarbon solvent (such as those described above).

The concentration (C) of the methine dye according to the invention in the colored composition of the invention may be freely set in accordance with the purpose. When the methine dye according to the invention is used as a yellow dye for a display of a display device that operates on the principle of electrowetting, the methine dye according to the invention may be used in a diluted state in which the methine dye is diluted with a non-polar solvent to a concentration of usually 0.2% by mass or higher in accordance with the required EC value (E indicating the absorption coefficient of the colored composition).

The colored composition of the invention preferably has a dynamic viscosity at 20° C. of 10 mPa·s or lower. More specifically, the dynamic viscosity is preferably 0.01 mPa·s or higher, and more preferably from 0.01 mPa·s to 8 mPa·s. The colored composition having a dynamic viscosity of 10 mPa·s or lower is suitable for use in image display materials for display devices that operate on the principle of electrowetting or electrophoresis. Such a colored composition is preferable particularly in a case in which the colored composition is used in optical shutters for image display devices that operate on the principle of electrowetting, since such a composition realizes a higher response speed and enables driving at a lower voltage compared to a case in which a composition having a higher viscosity is used.

Here, the dynamic viscosity is a value obtained by measurement of the colored composition of the invention conditioned at 20° C., using a viscometer (type 500, manufactured by Toki Sangyo Co., Ltd.).

In the invention, it is preferable that the dynamic viscosity of a 5% by mass solution of the dye in n-decane or n-hexane conditioned at 20° C. as measured with a viscometer (type 500, manufactured by Toki Sangyo Co., Ltd.) is from 0.01 mPa·s to 10 mPa·s.

The colored composition of the invention preferably has a lower relative dielectric constant, for example, a relative dielectric constant of from 2.0 to 10.0. The colored composition having a relative dielectric constant of from 2.0 to 10.0 is suitable for use in image display materials for display devices that operate on the principle of electrowetting or electrophoresis. Such a colored composition is preferable particularly in a case in which the colored composition is used in optical shutters for image display devices that operate on the principle of electrowetting, since such a colored composition realizes a higher response speed and enables driving at a lower voltage compared to a case in which a composition having a higher relative dielectric constant is used.

The relative dielectric constant of the colored composition is obtained by filling the colored composition into a glass cell provided with transparent indium-tin-oxide electrodes and having a cell gap of 10 μm, and measuring the electrical capacity of the resultant cell at 20° C. and 40 RH % using a type 2353 LCR meter (manufactured by NF Corporation) at measurement frequency of 1 kHz.

Image Display Structure and Display Device

Since the methine dye contained in the colored composition of the invention has excellent solubility in non-polar solvents, especially, hydrocarbon solvents, the colored composition is useful as an image display material for use in display devices such as displays, more specifically, display devices (e.g., displays) that operate on the principle of electrowetting or display devices (e.g., displays) that operate on the principle of electrophoresis. Accordingly, the colored composition of the invention is highly suitable for use in the production of image display structures that perform image display in these display devices.

The principle of electrowetting is described, for example, in WO 2005/098524. This principle utilizes the phenomenon that a hydrophobic oil layer arranged on a polymer having a hydrophobic surface is deformed by application of a voltage. A hydrophobic liquid (oil droplets) and a polymeric solid (for example, a polymer layer) are in the state of being surrounded by a hydrophilic liquid (for example, water). In a display that operates on this principle, a material having a hydrophobic surface having low affinity for water is used as, for example, a substrate disposed on a side farther from the viewing face of the display, and the space between the substrate and an electrode disposed on a side nearer to the viewing face is filled with a hydrophilic liquid (for example, water) and colored oil droplets (a hydrophobic liquid), and a voltage is applied thereto. The voltage applied between the hydrophilic liquid and the electrode generates a voltage difference, and the voltage difference causes Coulomb interaction between the hydrophilic liquid and the electrode such that the hydrophilic liquid and the electrode are attracted to each other. This causes the hydrophobic liquid to deform to cover only that part of the bottom of the pixel rather than the entire bottom of the pixel. Preferably, the polymer layer having a hydrophobic surface is transparent, and the area from which the covering by the hydrophobic liquid is removed turns into the transparent state. The change in the shape of the hydrophobic liquid between a case in which a maximum voltage is applied and a case in which a voltage is not applied is recognized by viewers as the switching between the on- and off-states of the pixel. Displays operating on this principle include transmissive electrowetting displays and reflective electrowetting displays. In the case of the transmissive electrowetting displays, the pixel appears transparent in the on-state since oil droplets covering the hydrophobic surface of the substrate move away to allow transmission of light through the hydrophilic liquid. In the off-state, the pixel appears colored or black, thereby creating an optical image. Examples of the reflective electrowetting displays include a display in which the polymeric solid to be used has white color, and a display in which a reflective layer is disposed underneath the electrode. In the case of the reflective electrowetting display, the pixel appears white in the on-state since oil droplets covering the hydrophobic surface of the substrate move away to expose the polymeric solid, thereby allowing the white color of the polymeric solid to be observed through the hydrophilic liquid. In the off-state, the pixel appears colored or black, thereby creating an optical image.

As explained above, a compound used for coloring the oil droplets (hydrophobic liquid) is required to have high solubility in the non-polar solvent that forms the oil droplets. The colored composition of the invention, in which the methine dye having excellent solubility in non-polar solvents is contained, is highly suitable for use in image display materials for image display devices utilizing the electrowetting method.

Specific examples of preferable image display structures includes an image display structure in which at least a polymer layer having a hydrophobic surface, an oil layer arranged to contact the surface of the polymer layer and formed using the colored composition of the invention, and a hydrophilic solution layer arranged to contact the oil layer are provided. An example of a display device having such an image display structure is an electrowetting device shown in FIG. 1.

As shown in FIG. 1, an electrowetting device 50 is provided with an incident surface 21a from which light enters, a light outgoing surface 21b from which light leaves and which is disposed at a side opposite to the incident surface 21a, a cell 21 closed by plural side surfaces 21c and 21d, an electrode 14 disposed within the cell 21, an insulating layer (a polymer layer) 13 disposed on the electrode 14, an oil layer 12 filled into the cell 21 and disposed to contact the insulating layer 13, a hydrophilic solution layer 11 contained in the cell 21 and disposed to contact the oil layer 12, and a power supply 25 electrically connected to the hydrophilic solution layer 11 and the electrode 14. In addition, the electrowetting device 50 is also equipped with a switch SW 26 for turning on or off the power supply 25, and a light source 27 that is disposed outside the cell 21 and that illuminates the cell 21.

Since the insulating layer 13 is formed using a hydrophobic material, the oil layer 12 contacts the surface of the insulating layer 13 when the switch SW 26 is in the off position, and separates the hydrophilic solution layer 11 and the insulating layer 13 from each other. However, when the SW 26 is switched to the on position, the electrode 14 and the hydrophilic solution layer 11 are electrically charged, as a result of which Coulomb interaction occurs therebetween. This increases the affinity between the electrode 14 and the hydrophilic solution layer 11, and the oil layer 12 moves so as to minimize its area of contact with the insulating layer 13. Here, since the oil layer 12 is formed using the above-described colored composition of the invention, the hue displayed by the device is the hue of the oil layer 12 when the switch SW 26 is in the off position, but is switched to be transparent when the switch SW 26 is switched to the on position. The hydrophilic solution layer 11 may be colored in a desired hue such as red, green, or blue, in which case two-color display is possible based on the hue formed by the oil layer and the hydrophilic solution layer and the hue of the hydrophilic solution layer alone. Furthermore, color image display is possible in a case in which plural cells respectively exhibiting desired hues (for example, three primary colors of R, G, and B) are arranged in a single pixel, and a voltage is selectively supplied cell by cell. In a case in which the hue of the oil layer 12 is black, a light is shielded when the switch SW 26 is in the off position; however, when the switch SW 26 is in the on position, light emitted from the light source 27 reaches the light outgoing surface 21b to display white. In this way, black-and-white display can be realized.

Electrowetting technique in the field of displays has various advantages, such as low energy consumption and rapid switching of the pixel display state (reduction of the switching time, which is essential for movie display), as compared to other display techniques. Furthermore, since the colorant dissolved in the hydrophobic liquid imparts color to the pixel, the pixel in the display can be designed to exhibit various colors. The colorant should be substantially insoluble in the hydrophilic liquid. This technique realizes a transmissive display based on colors of red (R), green (G), blue (B), and black, or a reflective electrowetting display based on colors of cyan (C), magenta (M), yellow (Y), and black.

The strength of coulomb interaction between the electrode and the hydrophilic solution is proportional to the voltage applied. Therefore, various gray-scale colors can be displayed in the pixel depending on the applied voltage, whereby a high quality image can be generated in the display.

The electrowetting technique can be applied to optical filters, adaptive lenses, and lab-on-a-chip techniques, as well as displays.

The principle of the electrophoretic method utilizes a phenomenon that application of an electric field causes electrically charged particles dispersed in a solvent to migrate. The electrophoretic method has advantages in terms of low power consumption and being free from viewing angle dependence.

In a display that operates on the principle of electrophoresis, a dispersion liquid in which electrically charged particles are dispersed in a colored solution is arranged between two substrates that face each other. Here, the dispersion liquid serves as an image display structure that contributes to color display function, for example, a color filter. An image is displayed by applying a voltage of about several volts between the substrates to cause the particles to migrate in the liquid phase. The display may be configured to have an image display structure that contributes to color displaying (so-called color filter), and in which a dispersion liquid containing electrically charged particles dispersed in the colored composition of the invention as a colored solution is microencapsulated and disposed between two substrates that face each other. The colored composition of the invention in which the methine dye having excellent solubility in non-polar solvents is contained is highly suitable for display methods utilizing the electrophoretic method.

According to the invention, it is possible to provide a colored composition and an image display structure, each of which is highly suitable for image display, particularly, image display by a display device operating via electrowetting or electrophoresis (for example, favorable on-off property at the time of image display (optical-shutter property)).

According to the invention, it is possible to provide a colored composition that is suitable for use in image display materials, particularly image display materials for display devices operating on the principle of electrophoresis or electrowetting, and to provide an image display structure that has a favorable on-off property (optical-shutter property) at the time of image display.

EXAMPLES

The invention is described more specifically below by reference to examples. However, the invention is not limited to the examples, as long as not departing from the sprit of the invention.

Examples 1 to 9

Each of the dyes shown above as Exemplary Compounds D-2, D-11, D-13, D-14, D-25, D-37, E-2, E-3, and E-7 was dissolved in a solvent (n-hexane) to make a 3% by mass solution, thereby preparing a colored composition (ink). Each of the colored compositions (inks) obtained was evaluated with respect to its color, absorption maximum wavelength (λmax), absorbance (abs), absorption coefficient (∈), viscosity, and relative dielectric constant, and solubility (% by mass) of each of the dyes in a solvent. The evaluation results are shown in Table 1.

Evaluation Method for Each Property

1. Color of Colored Composition

The color of the colored composition was visually evaluated.

2. Absorption Maximum Wavelength, Absorbance, and Absorption Coefficient of Colored Composition The absorption maximum wavelength (λmax) and the absorbance (abs) of the colored composition were measured using a visible-light spectrophotometer (trade name: UV-1800PC, manufactured by Shimadzu Corporation). The absorption coefficient (∈) was calculated based on the Lambert-Beer law.

3. Solubility in n-Hexane

The solubility of each of the dyes in n-hexane (solvent) was determined as follows.

Each of the dyes to be measured was dissolved in n-hexane heated at 50° C., thereby preparing a saturated solution. The saturated solution obtained was then left in an environment of 25° C. and 0.1 MPa for 1 hour. The precipitated dye was filtered, and the precipitation amount was measured, from which the solubility (% by mass) of the dye in n-hexane at 25° C. and 0.1 MPa was calculated.

4. Measurement of Relative Dielectric Constant

Solutions of the dye in n-hexane having concentrations of 5% by mass, 7.5% by mass and 10% by mass, respectively, were prepared, and individually injected into glass cells each having transparent indium-tin-oxide electrodes and a cell gap of 10 μm. The electrical capacities of the resultant cells were measured at 20° C. and 40% RH using a type 2353 LCR meter (manufactured by NF Corporation) at a measurement frequency of 1 kHz. The electrical capacity of n-hexane was also measured as a control sample. The relative dielectric constant of the dye was calculated based on the extrapolation method using the dielectric constants of the above prepared dye solutions calculated from the their electric capacities. The relative dielectric constant of Dye D-2 was found to be 8.2.

5. Measurement of Viscosity

A 5% by mass solution of each of the dyes in n-hexane was prepared, and the viscosity of each of the dye solutions was measured at 20° C. using an R-type viscometer (type 500, manufactured by Toki Sangyo Co., Ltd.).

Here, the viscosity (at 20° C.) of a 10% by mass solution of Dye D-2 in n-hexane was found to be 3.2 mPa·s.

Comparative Examples 1 and 2

Colored compositions of Comparative Examples 1 and 2 were prepared in the same manner as Example 1, except that the exemplary compound D-2 as a dye was replaced by the following compounds D-101 and D-102, respectively. Each of the colored compositions obtained was evaluated, in the same manner as Example 1, with respect to its color, absorption maximum wavelength, absorbance, and absorption coefficient, and solubility of each of the dyes in a solvent. Since D-101 and D-102 had low solubility and their solutions were not colored at all, the measurements of absorbance and the like could not be carried out. The evaluation results are shown in Table 1.

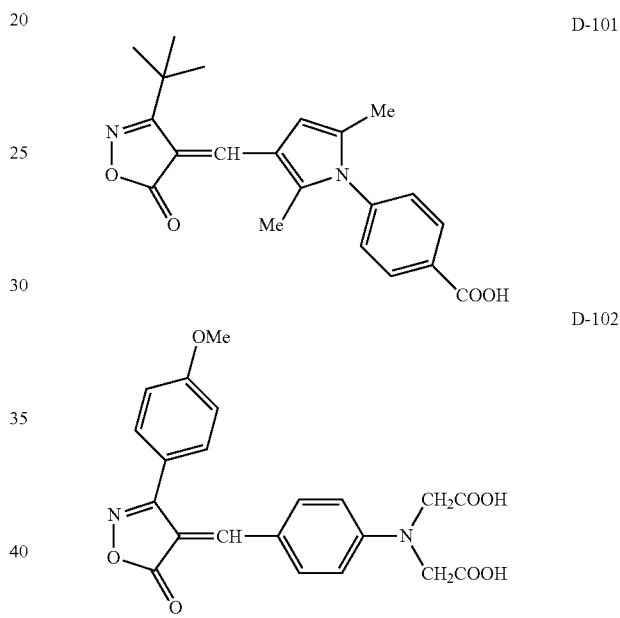

TABLE 1

| | Dye Compound | Solvent | Color of Solution | Solubility (% by mass) | Absorption Coefficient (∈) | Absorption Maximum Wavelength λmax | Relative Dielectric Constant | Viscosity (10%) (mPa·S) | Viscosity (5%) (mPa·S) |
|---|---|---|---|---|---|---|---|---|---|
| Ex. 1 | D-2 | n-hexane | Yellow | 10.5 | $4.50 \times 10^4$ | 468 nm | 8.2 | 3.2 | 2.1 |
| Ex. 2 | D-11 | n-hexane | Yellow | 5.0 | $3.80 \times 10^4$ | 459 nm | — | — | 2.1 |
| Ex. 3 | D-13 | n-hexane | Yellow | 9.9 | $4.11 \times 10^4$ | 464 nm | 9.0 | — | 2.2 |
| Ex. 4 | D-14 | n-hexane | Yellow | 5.3 | $3.96 \times 10^4$ | 456 nm | 10.0 | — | 2.3 |
| Ex. 5 | D-25 | n-hexane | Yellow | 8.0 | $3.66 \times 10^4$ | 426 nm | — | — | 2.1 |
| Ex. 6 | E-2 | n-hexane | Red-orange | 6.5 | $5.10 \times 10^4$ | 515 nm | 9.5 | — | 2.1 |
| Ex. 7 | E-7 | n-hexane | Red | 5.0 | $5.20 \times 10^4$ | 556 nm | — | — | 2.3 |
| Ex. 8 | E-3 | n-hexane | Red | 7.2 | $5.20 \times 10^4$ | 530 nm | 9.0 | — | 2.1 |
| Ex. 9 | D-37 | n-hexane | Yellow | 1.2 | $4.10 \times 10^4$ | 465 nm | — | — | — |
| Comp. Ex. 1 | D-101 | n-hexane | Not colored at all. | 0.015 | — | — | — | — | — |
| Comp. Ex. 2 | D-102 | n-hexane | Not colored at all. | 0.008 | — | — | — | — | — |

Ex.: Example;
Comp. Ex: Comparative Example.

As shown in Table 1, it is shown that exemplary compounds D-2, D-11, D-13, D-14, D-25, D-37, E-2, E-3, and E-7, which are methine dyes according to the invention, have higher solubility in hydrocarbon solvents compared to the comparative compounds D-101 and D-102, and that the color compositions obtained using the exemplary compounds according to the invention exhibited high absorption coefficients.

Accordingly, from these results, it is understood that exemplary compounds D-2, D-11, D-13, D-14, D-25, D-37, E-2, E-3, and E-7 are suitable for use in the production of optical-shutters for display devices that operate on the principle of electrowetting or display devices that operate on the principle of electrophoresis.

In addition, the colored compositions of the present invention have small relative dielectric constants and small viscosities, although they have high dye concentrations. Therefore, it is understand that the color compositions of the invention can provide a higher contrast ratio and response speed to optical shutters for display devices that operate on the principle of electrowetting.

Example 10

Preparation of Black Colored Composition

Exemplary compounds of D-2 and E-2 as dyes according to the invention, and the following compounds C-1 and C-2 as cyan dyes were dissolved in n-decane at the following compositional ratio.

| Compositional Ratio | |
|---|---|
| Exemplary compound D-2 | 290 mg |
| Exemplary compound E-2 | 240 mg |
| Dye C-1 (following structure) | 300 mg |
| Dye C-2 (following structure) | 300 mg |
| Solvent: n-decane | 900 mg |

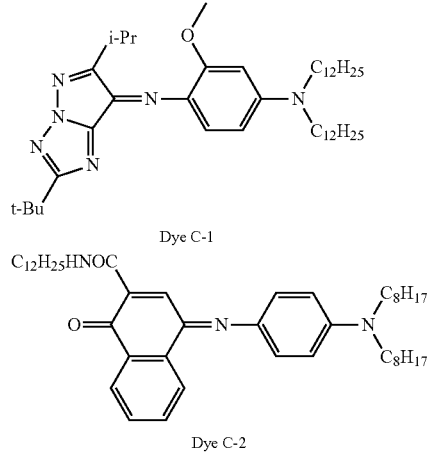

Dye C-1

Dye C-2

The colored composition obtained was black. The viscosity of the colored composition conditioned at 20° C. was measured using an R-type viscometer (type 500, manufactured by Toki Sangyo Co., Ltd.), and was found to be 8.0 mPa·s. In a case in which a colored composition having low viscosity is used in an optical shutter for a display that operates on the principle of electrowetting, such an optical shutter realizes a higher response speed and can be driven at a lower voltage compared to a case in which a composition having a higher viscosity is used. Accordingly, it is understood that the colored composition of the invention is suitable for use in optical shutters of displays that operate on the principle of electrowetting.

Examples 11 to 20

A cell was prepared in which an ITO electrode (corresponding to electrode 14 of FIG. 1) and an insulating layer made of a fluorine polymer (trade name: CYTOP, manufactured by Asahi Glass Co. Ltd.) (corresponding to insulating layer 13 of FIG. 1) were sequentially arranged. Any one of the colored compositions of Examples 1 to 10 or the black colored composition was filled into the cell, and a sodium chloride aqueous solution or ethylene glycol (hydrophilic liquid) was further filled into so as to be disposed thereon. In this way, an electrowetting device as shown in FIG. 1 is prepared.

All of the electrowetting devices obtained exhibited excellent on-off switching property (so-called optical-shutter property) at the time of image display.

The colored composition of the invention is highly suitable for use in display devices such as displays, particularly, display devices that operate on the principle of electrowetting or display devices that operate on the principle of electrophoresis.

All publications, patent applications, and technical standards mentioned in this specification are herein incorporated by reference to the same extent as if each individual publication, patent application, or technical standard was specifically and individually indicated to be incorporated by reference.

What is claimed is:

1. A colored composition for producing an optical-shutter layer of a display device that operates on the principle of electrowetting or the principle of electrophoresis, the colored composition comprising:
   a non-polar solvent; and
   a methine dye having a solubility in n-hexane of 1% by mass or higher at 25° C. and 0.1 MPa, wherein the methine dye is selected from:
   a compound represented by the following Formula (1)

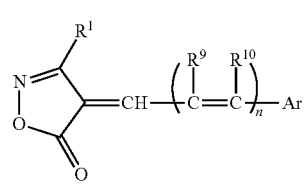

wherein, in Formula (1), $R^1$ represents a hydrogen atom, an alkyl group, an aryl group, —COO$R^a$, or —CONR$^{11}$R$^{12}$; $R^a$ represents an alkyl group or an aryl group; Ar represents an aromatic ring; each of $R^9$ and $R^{10}$ independently represents a hydrogen atom or an alkyl group; each of and $R^{11}$ and $R^{12}$ independently represents a hydrogen atom, an alkyl group, or an aryl group, and and $R^{11}$ and $R^{12}$ may be linked to each other to form a 5-membered, 6-membered, or 7-membered ring; n represents 2; and none of $R^1$, $R^9$, $R^{10}$ and Ar has a dissociable group different from NH, or
   a compound selected from the group consisting of compounds E-1 to E-6, wherein each of compounds E-1 to E-6 has the general formula below:

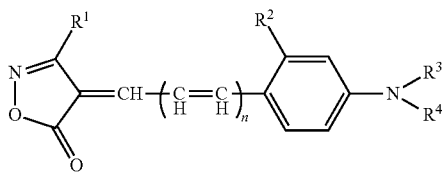

and wherein, in each of compounds E-1 to E-6, $R^1$ to $R^4$ and n are as follows:

| Compound No. | $R^1$ | n | $R^2$ | $R^3$ | $R^4$ |
|---|---|---|---|---|---|
| E-1 | Me | 1 | H | n-$C_{12}H_{25}$ | n-$C_{12}H_{25}$ |
| E-2 | t-Bu | 1 | Me | n-$C_{12}H_{25}$ | n-$C_{12}H_{25}$ |
| E-3 | t-Bu | 1 | MeO | n-$C_8H_{17}$ | n-$C_8H_{17}$ |
| E-4 | Ph | 1 | H | n-$C_{10}H_{23}$ | n-$C_{10}H_{23}$ |
| E-5 | 4-n-BuPh | 1 | Et | -$CH_2CH(Et)C_4H_9$ | -$CH_2CH(Et)C_4H_9$ |
| E-6 | $CF_3$ | 1 | $CF_3O$ | n-$C_8H_{17}$ | n-$C_8H_{17}$. |

2. The colored composition according to claim 1, wherein a relative dielectric constant of the methine dye is from 2 to 10.

3. The colored composition according to claim 1, wherein a viscosity of the colored composition at 20° C. is from 0.01 mPa·s to 10 mPa·s.

4. The colored composition according to claim 1, wherein a content of the methine dye is from 5% by mass to 70% by mass with respect to a total mass of the colored composition.

5. The colored composition according to claim 1, wherein the non-polar solvent comprises a solvent selected from the group consisting of n-hexane, n-decane, dodecane, tetradecane and hexadecane.

6. The colored composition according to claim 1, wherein a content of the non-polar solvent is 70% by mass or higher with respect to a total mass of solvents included in the colored composition.

7. An image display structure comprising:
a hydrophobic polymer layer having a hydrophobic surface;
an oil layer arranged to contact the surface of the hydrophobic polymer layer, the oil layer comprising the colored composition of claim 1; and
a hydrophilic liquid layer arranged to contact the oil layer.

8. The colored composition according to claim 1, wherein a proportion of the non-polar solvent to the entire solvent contained in the colored composition is 100% by mass.

9. The colored composition according to claim 1, wherein a content of the methine dye is from 10% by mass to 70% by mass with respect to a total mass of the colored composition.

10. A colored composition for producing an optical-shutter layer of a display device that operates on the principle of electrowetting or the principle of electrophoresis, the colored composition comprising:
a non-polar solvent; and
a methine dye represented by the following Formula (2) and having a solubility in n-hexane of 1% by mass or higher at 25° C. and 0.1 MPa:

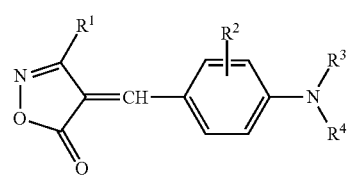

(2)

wherein, in Formula (2), $R^1$ represents a hydrogen atom, an alkyl group, an aryl group, —$COOR^a$, or —$CONR^{11}R^{12}$; $R^a$ represents an alkyl group or an aryl group; $R^2$ represents a hydrogen atom, a halogen atom, an alkyl group, an alkoxy group, an aryloxy group, —$NHCOR^{11}$, —$NHCONHR^{11}$, or —$NHCOOR^{11}$; each of $R^3$ and $R^4$ independently represents a hydrogen atom, an n-decyl group, a 2-ethylhexyl group, a 2-methylhexyl group, a 3,5,5-trimethylhexyl group, an ethoxycarbonylmethyl group, an ethoxycarbonylethyl group, a N,N-dibutylaminocarbonylmethyl group, or an aryl group, and $R^3$ and $R^4$ may be linked to each other to form a 5-membered, 6-membered, or 7-membered ring; each of $R^{11}$ and $R^{12}$ independently represents a hydrogen atom, an alkyl group, or an aryl group, and $R^{11}$ and $R^{12}$ may be linked to each other to form a 5-membered, 6-membered, or 7-membered ring; and none of $R^1$ to $R^4$ has a dissociable group different from NH.

11. The colored composition according to claim 10, wherein $R^1$ in Formula (2) represents an alkyl group having from 7 to 30 carbon atoms.

12. The colored composition according to claim 10, wherein a content of the methine dye is from 5% by mass to 70% by mass with respect to a total mass of the colored composition.

13. The colored composition according to claim 10, wherein the non-polar solvent comprises a solvent selected from the group consisting of n-hexane, n-decane, dodecane, tetradecane and hexadecane.

14. The colored composition according to claim 10, wherein a content of the non-polar solvent is 70% by mass or higher with respect to a total mass of solvents included in the colored composition.

15. An image display structure comprising:
a hydrophobic polymer layer having a hydrophobic surface;
an oil layer arranged to contact the surface of the hydrophobic polymer layer, the oil layer comprising the colored composition of claim 10; and
a hydrophilic liquid layer arranged to contact the oil layer.

* * * * *